United States Patent Office 2,759,084
Patented Aug. 14, 1956

2,759,084

WELDING COMPOSITION FOR DEPOSITING SOFT IRON

Clarence E. Jackson and Arthur E. Shrubsall, Niagara Falls, N. Y., assignors to Union Carbide and Carbon Corporation, a corporation of New York No Drawing. Application September 15, 1953, Serial No. 380,371

5 Claims. (Cl. 219—10)

This invention relates to electric welding. More particularly, this invention relates to electric welding processes in which molten metal is deposited from a bare metal electrode onto a metal workpiece and coalesced with the latter, the entire welding zone including the melting end of the electrode and the molten deposited metal being covered by a deep blanket of a "welding medium" or "melt." As now practised, this process generally utilizes a welding medium which may be of partially molten, initially comminuted and unbonded silicates, or the like, substantially free from gas-evolving substances; or other welding media may be used, for example, silica, alumina, lime and magnesia. Such processes are described, for instance, in Jones et al., Patent 2,043,960, and Miller, Patent 2,228,639.

In the present status of this art, the desirability of depositing a layer or band of soft iron onto a metal workpiece is thwarted by the fact that such deposit carries with it certain minor alloying elements which have the effect of forming a relatively hard deposit. This fact also manifests itself in the welding of soft iron, when the base metal is of soft iron composition, the weld metal is, by the limitations imposed by the present knowledge and practice of the art of so-called submerged melt welding, of higher hardness than the base metal, a situation of obvious undesirability. It is apparent that a means of depositing soft iron by use of the submerged melt would find wide industrial application.

It is the object of this invention to provide a means whereby a soft iron layer is deposited from a bare metal electrode onto a metal workpiece and coalesced with the latter, using the so-called submerged-melt or submerged arc welding process.

It is another object of this invention to provide a means whereby soft iron articles may be welded together with the deposited weld metal being substantially of no greater hardness than the workpieces thus joined together by use of the so-called submerged-melt welding process.

Other objects to be achieved by this invention will be apparent hereinafter.

In using the so-called "submerged melt" welding process, some minor alloying elements may be incorporated in the weld deposit. These alloying elements, which include carbon, manganese and silicon, are derived from the carbon steel or soft iron welding electrode and the metal work piece adjacent the welding zone.

According to the present invention, the minor alloying elements ordinarily found in a weld deposit may be removed to a substantial extent, leaving a relatively soft weld deposit, which to all intents and purposes may be said to be a high purity iron metal. This is accomplished by increasing the available oxygen content of the welding medium, by including therein easily reducible oxidic compounds. The fused welding composition, being lighter than the molten weld metal, rises to the top of the welding zone and forms a protective covering over the weld metal. In so doing, the fused welding composition performs its function as a flux and purifies the weld metal. As a result, in the welding process, undesirable alloying elements in the weld deposit are oxidized and carried away, partly by the fused welding composition and partly as a gas.

Among the distinguishing features of the invention are the removal of minor alloying elements from a plain carbon steel or soft iron electrode and from the fused base metal, thus allowing deposition of essentially pure iron in the base metal; the ability of the welding composition to oxidize minor constituents of the electrode; the unusually high electrical conductivity of the welding medium. The welding composition of the invention comprises, as its principal ingredients, by weight, 4% to 32% calcium oxide, 40% to 75% iron oxides (calculated as FeO), up to 25% aluminum oxide, and up to 25% calcium fluoride. Specific compositions illustrative of the invention that have yielded good results are listed as follows:

|  | A | B |
|---|---|---|
|  | Percent | Percent |
| CaO | 7.22 | 8.84 |
| Al₂O₃ | 23.50 | 21.50 |
| FeO | 27.76 | 21.00 |
| Fe₂O₃ | 17.04 | 24.24 |
| Total Fe | 42.86 | 41.81 |
| CaF₂ | 15.54 | 15.96 |
| TiO₂ | 4.62 | 4.76 |
| SiO₂ | 3.09 | 5.44 |
| MgO | 2.42 |  |
| Total | 101.19 | 101.74 |

The quality of the deposit, particularly with reference to surface appearance is improved by the addition of up to 2% of a reducible oxide compound, for example vanadium, manganese, titanium, or the like.

The mixture may be prepared by sintering the ingredients for varying lengths of time at temperatures in the range from about 900° C. to 1200° C., as for example, one hour at 1175° C., and sizing to 12 by 200 mesh before making the small addition of the readily reducible oxidic compound referred to above. An alternative method of preparing the mixture is that of fusing the mixture in a basic-lined electric furnace. Although both methods are satisfactory, the fusion method gives a uniform product which can be properly sized and the reclaimed melt continues to be of the same quality as the original product. It should be noted, however, that the procedure followed in the fusion method of preparing the mixture is critically important. A preferred method is set forth as follows:

The lime, alumina and titania are thoroughly mixed and fed to the furnace at such a rate that a fluid bath is maintained. The calcium fluoride is added in small increments throughout the melting operation as required to maintain a satisfactory degree of fluidity in the bath. After all the lime, alumina and titania have been fused, the magnetite ore or other iron oxides is added to the bath at as rapid a pace as is possible without causing the bath to freeze up, followed by the addition of any remaining calcium fluoride. The heat is then stirred and tapped promptly.

As an example of an application of the use of such a deposit of soft iron, we may suggest that of the rotating band of an artillery projectile. The present practice utilizes copper in the form of a band that is swaged onto the body of the projectile or by shrinking the heated band in position. However, such practice has certain difficulties and inherent disadvantages, such as the occasional occurrence of loose bands, the necessity for heavy presses and like equipment, the possible formation of copper oxide under the band during the hot swaging process, the requirement of various complicated production sequences, the weakening of the projectile body underneath the band by the undercutting for positioning the band, and the cost and availability of the metal forming the band, to list a few. By use of the present invention, a rotating band of soft iron may be affixed to an artillery projectile, thus obviating the difficulties and disadvantages of the copper rotating band. The following examples are listed showing one of the applications of the invention:

A soft iron rotating band 1½ inches wide was deposited on a 105 mm. artillery projectile using composition "A" (see above). Two passes were made, welding in the usual manner using direct current, reverse polarity. A steel electrode was used, and a current of 290 amperes and a voltage of 26, requiring a total welding time of 7 minutes. The deposited soft iron band had a hardness range of 56 to 71 Rockwell B. The compositions of the weld metal, electrode and projectile are listed as follows:

|  | Carbon | Manganese | Silicon |
|---|---|---|---|
|  | Percent | Percent | Percent |
| Weld metal | 0.023 | 0.01 | 0.008 |
| Electrode | 0.08 | 0.25 | 0.04 |
| Projectile | 0.50 | 0.88 | 0.15 |

In another example, use was made of an oscillating mechanism in order to produce the desired width of deposit in one revolution of the projectile. Deposits were applied with a steel electrode of ⅛ inch diameter, using 340 amperes, 24 volts, direct current, reverse polarity, and a peripheral speed of 3½ to 4 inches per minute. With 62 oscillations per minute and an amplitude of 13/16 inches, a weld deposit 1 to 1 1/16 inches wide was deposited in one pass on a 105 mm. artillery projectile in slightly more than 3 minutes welding time. The resulting soft iron band had a hardness range of 50 to 62 Rockwell B.

Illustrating the success of the welding compositions of the invention in the welding of soft iron, joints were welded in ⅜ inch soft iron plates, commercially designated as "Armco" iron. The welds were made with a steel electrode of ¼ inch diameter, using 600 amperes, 27 volts, direct current, reverse polarity, at a speed of 4 inches per minute. Welds of satisfactory quality were obtained, the analysis of the welding composition used being: 8.21% CaO, 16.14% CaF$_2$, 21.06% Al$_2$O$_3$, 39.08% Fe (as FeO), 5.16% TiO$_2$.

Illustrating another successful application of the welding compositions of the invention, soft iron deposits may be made on hardenable materials in order to obtain a machinable surface, or the like. For example, a high-carbon steel surface, commercially designated as S. A. E. 1045, was clad with a soft iron deposit using a composition of the invention. The deposits were made using 400 amperes, 25 to 30 volts, direct current, reverse polarity, at a speed of 6 inches per minute. The analysis of the welding compositon was: 25 CaO, 60% Fe$_3$O$_4$, 15% CaF$_2$. The deposited soft iron surface had a hardness of 63 Rockwell B.

Other applications of the compositions of the invention will be apparent to those skilled in the art, all coming within the scope of the invention.

What is claimed is:

1. In an electric welding process of the submerged melt type wherein a blanket of comminuted welding medium covers the welding region and a carbon steel welding electrode is immersed in said welding medium, the improvement of refining the welding electrode of substantially all the carbon content and incidental impurities therein to produce a weld deposit of substantially soft, elemental iron, said improvement comprising providing readily reducible oxides in said welding medium, said welding medium being composed of 4% to 32% lime, 40% to 75% iron oxide, up to 25% alumina and up to 25% calcium fluoride.

2. In an electric welding process of the submerged melt type wherein molten metal is deposited from a carbon steel electrode in the welding region of a workpiece, and a welding medium protectively covers the molten metal to exclude oxygen therefrom, the improvement of incorporating in said welding medium, oxygen in a form and an amount sufficient to react with the impurities of said molten metal for removing the same therefrom, said improvement comprising providing as said welding medium a composition composed of 4% to 32% lime, 40% to 75% iron oxide, up to 25% alumina, up to 25% calcium fluoride and up to 2% of an oxidic vanadium compound.

3. In an electric welding process of the submerged melt type wherein molten metal is deposited from a carbon steel electrode in the welding region of a workpiece and a welding medium protectively covers the molten metal to insure that said molten metal is substantially unaltered in composition from said electrode, the improvement of refining said molten metal of carbon and incidental impurities during the electric welding process by providing a welding medium composed of 4% to 32% lime, 40% to 75% iron oxide, up to 25% alumina, up to 25% calcium fluoride, up to 10% titania, not over 10% silica, up to 15% magnesia, and up to 2% of an oxidic vanadium compound.

4. In an electric welding process of the submerged melt type wherein molten metal having carbon and incidental impurities is deposited from a carbon steel electrode in the welding region of a workpiece, and wherein depletion or enrichment of the metal values in the molten metal during the welding process is normally restrained by a protective welding medium, the improvement of refining said molten metal of carbon and incidental impurities during the welding process by providing a welding medium composed of 4% to 32% lime, 40% to 75% iron oxide, up to 25% alumina, up to 25% calcium fluoride, up to 10% titania, not over 10% silica, up to 15% magnesia, and up to 2% of an oxidic vanadium compound.

5. In an electric welding process of the submerged melt type wherein molten metal is deposited in a workpiece from a carbon steel electrode while the welding region and molten metal are covered by a welding medium, the improvement of refining said molten metal of carbon and incidental impurities by providing as said medium a composition having reducible oxides, said medium being composed of 4% to 32% lime, 40% to 75% iron oxide, up to 25% alumina and up to 25% calcium fluoride, said medium reacting with the carbon and incidental impurities of said molten metal to remove the same therefrom, and thereby provide a deposit of soft, substantially pure, iron.

References Cited in the file of this patent

UNITED STATES PATENTS

| 1,312,254 | Jones | Aug. 5, 1919 |
| 1,752,793 | Hammers | Apr. 1, 1930 |
| 2,043,960 | Jones | June 9, 1936 |
| 2,150,000 | Lair | Mar. 7, 1939 |
| 2,191,473 | Blumberg | Feb. 27, 1940 |
| 2,200,737 | Clapp | May 14, 1940 |
| 2,308,194 | Miller | Jan. 12, 1943 |
| 2,463,096 | Garriott | Mar. 1, 1949 |
| 2,474,787 | Landis et al. | June 28, 1949 |
| 2,597,851 | Bowden | May 27, 1952 |